(12) United States Patent
Vivanco et al.

(10) Patent No.: US 9,380,553 B1
(45) Date of Patent: Jun. 28, 2016

(54) PAGING A WIRELESS DEVICE

(75) Inventors: Daniel Vivanco, Sterling, VA (US);
Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 404 days.

(21) Appl. No.: 13/620,114

(22) Filed: Sep. 14, 2012

(51) Int. Cl.
*H04W 68/00* (2009.01)
*H04W 64/00* (2009.01)
*H04W 36/08* (2009.01)

(52) U.S. Cl.
CPC ............. *H04W 64/00* (2013.01); *H04W 36/08* (2013.01); *H04W 68/00* (2013.01)

(58) Field of Classification Search
USPC .......... 370/230, 252, 328, 331, 346; 455/404.2, 414.2, 456.1, 458
See application file for complete search history.

(56) References Cited

U.S. PATENT DOCUMENTS

| | | | | |
|---|---|---|---|---|
| 5,917,822 A | * | 6/1999 | Lyles et al. | 370/395.4 |
| 5,966,662 A | * | 10/1999 | Murto | 455/458 |
| 6,138,025 A | * | 10/2000 | Lee et al. | 455/453 |
| 6,185,421 B1 | * | 2/2001 | Alperovich et al. | 455/433 |
| 6,445,925 B1 | * | 9/2002 | Kwon et al. | 455/446 |
| 7,366,524 B2 | | 4/2008 | Watanabe et al. | |
| 7,941,175 B1 | * | 5/2011 | Hoff et al. | 455/527 |
| 8,543,112 B2 | * | 9/2013 | Fox et al. | 455/435.3 |
| 2009/0213762 A1 | * | 8/2009 | Guo et al. | 370/254 |
| 2010/0041393 A1 | * | 2/2010 | Kwon et al. | 455/426.1 |
| 2010/0220680 A1 | * | 9/2010 | Ramankutty et al. | 370/329 |
| 2010/0227627 A1 | * | 9/2010 | Ishii et al. | 455/456.2 |
| 2010/0285816 A1 | * | 11/2010 | Vos et al. | 455/456.1 |
| 2013/0143562 A1 | * | 6/2013 | Singh et al. | 455/436 |
| 2013/0143563 A1 | * | 6/2013 | Singh | H04W 68/02 455/436 |
| 2013/0231099 A1 | * | 9/2013 | Meshkati et al. | 455/418 |
| 2014/0179357 A1 | * | 6/2014 | Salvador et al. | 455/458 |

\* cited by examiner

*Primary Examiner* — Kwang B Yao
*Assistant Examiner* — Nguyen Ngo (57) ABSTRACT

In systems and methods of paging a wireless device, it is determined that an application requirement of an application running on a wireless device meets a requirement threshold. A first subset of tracking areas of a tracking area list are selected based on a paging load. A paging message is sent for the wireless device to the selected subset of tracking areas.

7 Claims, 7 Drawing Sheets

PAGING A WIRELESS DEVICE

TECHNICAL BACKGROUND

A wireless device can enter into a lower power state, such as an idle mode or a sleep mode, in which the wireless device is not in continuous communication with an access node. A communication system maintains a record of a recent location of the wireless device in an idle state in order to route paging messages to the wireless device if data is sent to the wireless device. One method of maintaining a record of a recent location of a wireless device is by use of a tracking area. A tracking area comprises a group of access nodes which are associated with a tracking area code. In addition, a tracking area list typically comprises the tracking area and a plurality of other tracking areas which are adjacent or proximate to the tracking area. When a message such as data arrives for a wireless device in an idle mode, a first paging message can be sent to the access node most recently in communication with the wireless device. When the wireless device does not respond to the first paging message within a predetermined period of time, a second paging message can be sent to all of the access nodes in the tracking area. When the wireless device does not respond to the second paging message within a predetermined period of time, a third paging message can be sent to all of the access nodes in the tracking area list.

OVERVIEW

In an embodiment, it is determined that an application requirement of an application running on a wireless device meets a requirement threshold. A first subset of tracking areas of a tracking area list are selected based on a paging load. A paging message is then sent for the wireless device to the selected subset of tracking areas.

DETAILED DESCRIPTION

In an embodiment, it is determined that an application requirement of an application running on a wireless device meets a requirement threshold. A first subset of tracking areas of a tracking area list is selected based on a paging load, and a paging message for the wireless device is sent to the selected subset of tracking areas. In an embodiment, the subset of tracking areas of a tracking area list is selected based on a paging load such that the paging load does not meet a paging load threshold. In an embodiment, a second subset of tracking areas of the tracking area list is selected based on the paging load when a response to the first paging message is not received from the wireless device within a predetermined period of time, and a second paging message is sent to the second subset of tracking areas.

Figure 1:
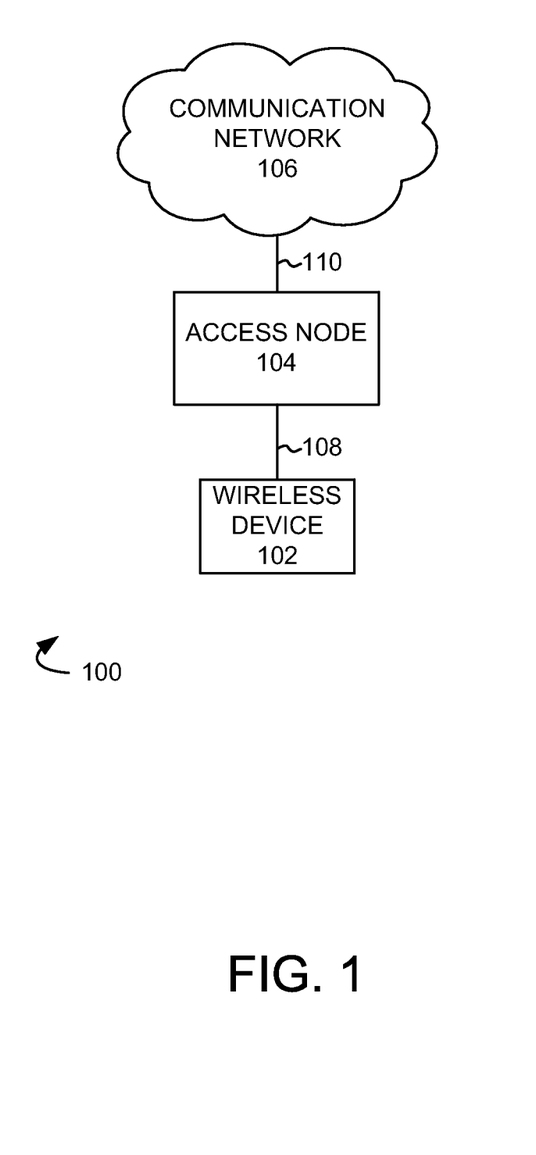
FIG. 1 illustrates an exemplary communication system for paging a wireless device.

FIG. 1 illustrates an exemplary communication system 100 for paging a wireless device comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise a wireless network, including base stations, wireless communication nodes, telephony switches, internet routers, network gateways, computer systems, communication links, or some other type of communication equipment, and combinations thereof. Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In an embodiment, it is determined that an application requirement of an application running on wireless device 102 meets a requirement threshold. A first subset of tracking areas of a tracking area list is selected based on a paging load, and a paging message for the wireless device is sent to the selected subset of tracking areas.

Figure 2:
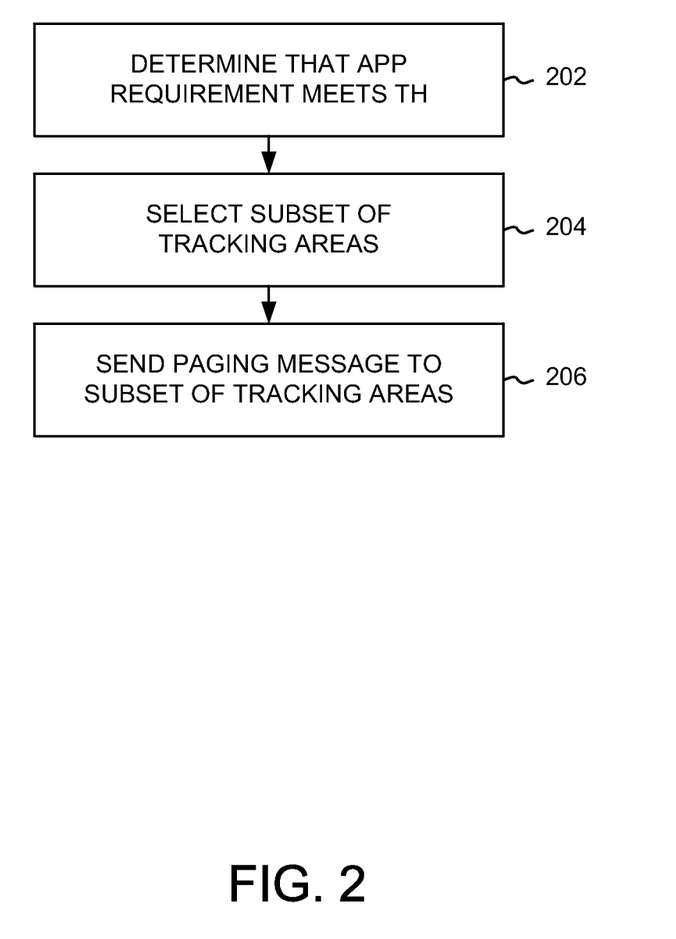
FIG. 2 illustrates an exemplary method of paging a wireless device.

FIG. 2 illustrates an exemplary method of paging a wireless device. In operation 202, it is determined that an application requirement of an application running on a wireless device meets a requirement threshold. For example, an application running on wireless device 102 can be determined to be, for example, a delay sensitive application. Examples of a delay sensitive application include a streaming video application or a voice application (such as a VoIP application) which requires a minimum bit rate of data per unit time, or which can tolerate a maximum data delay per unit time, to meet a minimum performance requirement. A delay sensitive application can thus have an application requirement which meets a performance threshold.

In operation 204, a first subset of tracking areas of a tracking area list can be selected based on a paging load. A wireless device such as wireless device 102 can enter into a lower power state, such as an idle mode or a sleep mode, in which wireless device 102 is not in continuous communication with access node 104. Communication system 100 maintains a record of a recent location of wireless device 102 in order to route paging messages to wireless device 102, for example, if data is sent to wireless device 102. One method of maintaining a record of a recent location of wireless device 102 is by use of a tracking area. A tracking area comprises a group of access nodes which are associated with a tracking area code. In an embodiment, communication network 100 maintains a record of the access node that wireless device 102 communicated with most recently, as well as the associated tracking area code, and thus the associated tracking area, of that access node. Wireless device 102 can be considered to be within the tracking area associated with the most recent access node.

When a message such as data arrives for wireless device 102, a first paging message is sent to the access node most recently in communication with wireless device 102. When wireless device 102 does not respond to the first paging message within a predetermined period of time, a second paging message can be sent to the access nodes in the tracking area. In addition, when wireless device 102 does not respond to the second paging message within a predetermined period of time, a third paging message can be sent to the access nodes in a plurality of tracking areas in a tracking area list. A tracking area list typically comprises a plurality of tracking areas which are adjacent or proximate to the tracking area. Since each tracking area typically comprises a plurality of access nodes, sending a paging message (such as the third paging message) to the tracking area list can result in sending the paging message to a relatively large number of access nodes. While this may permit the third paging message to reach wireless device 102 relatively quickly, sending the third message to all access nodes in the tracking area list can consume network resources and contribute to network congestion, and can result in a substantial amount of network paging overhead or network paging load.

In operation 204, based on a paging load, for example, a paging load anticipated to result from sending a paging message to a plurality of tracking areas, a first subset of tracking areas of the tracking area list can be selected. In an embodiment, the first subset of tracking areas can be selected according to a paging load threshold, such that the paging load of the paging message sent to the first subset of tracking areas does not meet a paging load threshold. In operation 206, a paging message is sent for the wireless device (for example, wireless device 104) to the selected subset of tracking areas.

Figure 3:
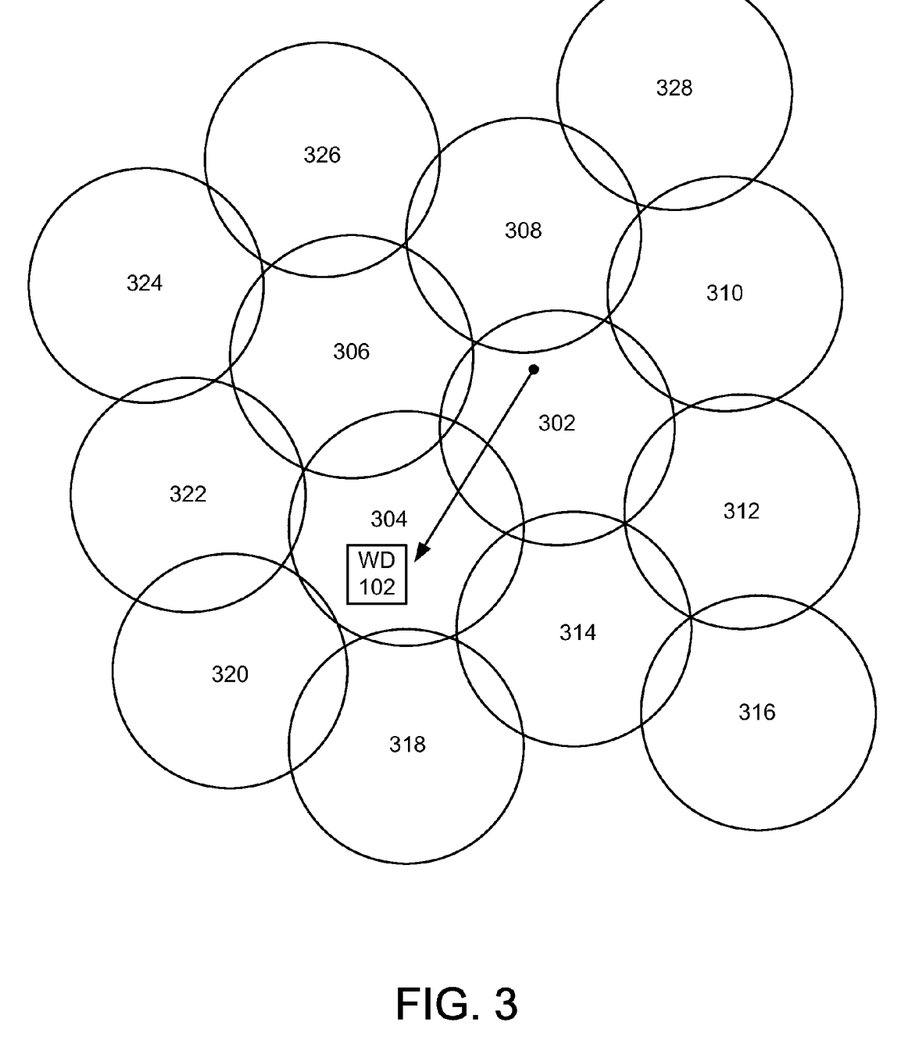
FIG. 3 illustrates an exemplary configuration of tracking areas.

FIG. 3 illustrates an exemplary configuration of tracking areas. (While the tracking areas in FIG. 3 are illustrated as circles for simplicity, this is merely exemplary, and the geometry of a tracking area may vary depending on numerous factors, including network topology and geography.) For example, a last access node in communication with wireless device 102 can be in tracking area 302. That is, wireless device 102 can be in communication with an access node in tracking area 302 when the wireless device enters an idle mode. Communication system 100 can maintain a record of the access node, as well as the associated tracking area 302. When a message arrives for wireless device 102, a first paging message can be sent to the access node most recently in communication with wireless device 102. When wireless device 102 does not respond to the first paging message within a predetermined period of time, a second paging message can be sent to the access nodes of tracking area 302.

However, wireless device 102 has moved to tracking area 304, and so the second paging message does not reach wireless device 102, and wireless device 102 fails to respond to the second paging message in a predetermined period of time. Thereafter, a first subset of tracking areas of a tracking area list based can be selected based on a paging load, and a third paging message can be sent to the selected subset of tracking areas. For example, a tracking area list can comprise tracking areas 304-328 as nearby or proximate tracking areas to tracking area 302. Based on an anticipated paging load, that is, the load to the communication system supporting the access nodes of the tracking area list, a subset of tracking areas from the tracking area list can be selected. For example, tracking areas 304, 306, 308, 310, 312 and 314 can be selected from the tracking area list, and the third paging message can be sent to the selected subset of tracking areas. Thus, the communication system can balance locating of wireless device 102 quickly and the reduction of network paging load or network paging overhead associated with sending a paging message to numerous access nodes.

Figure 4:
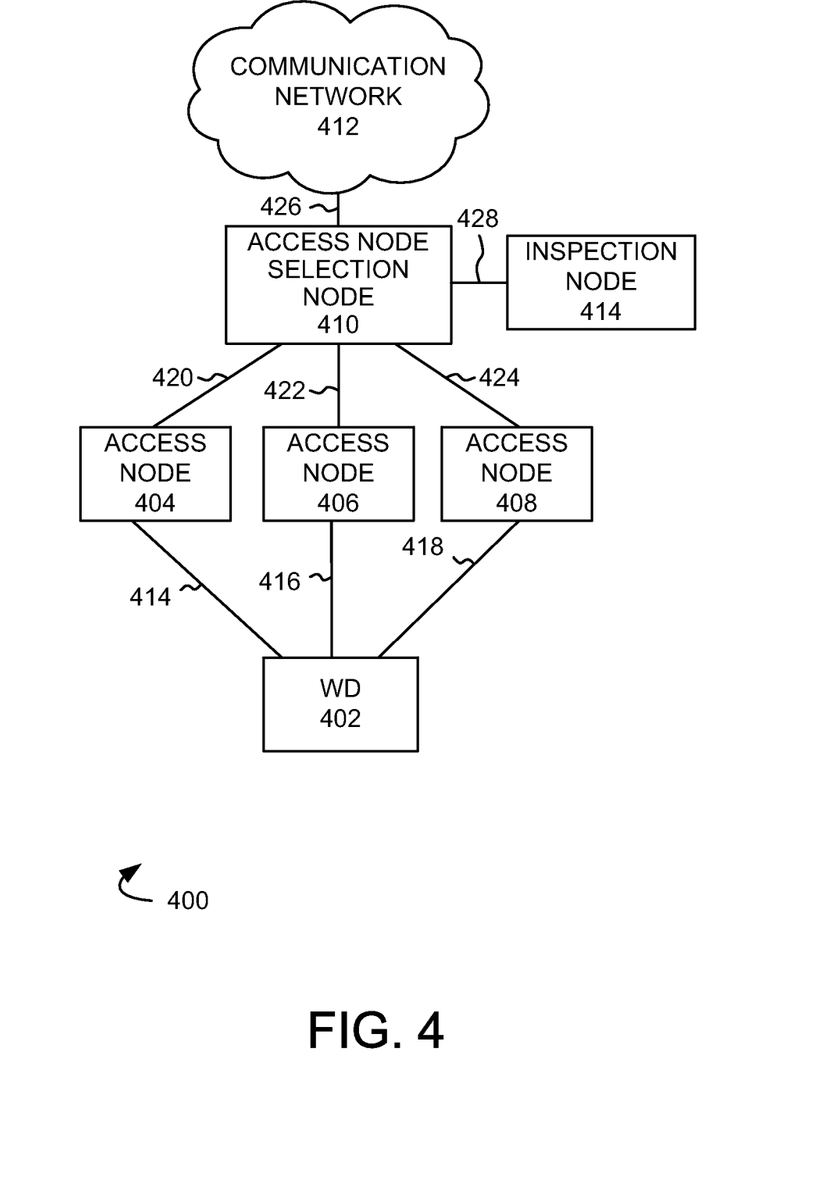
FIG. 4 illustrates another exemplary communication system for paging a wireless device.

FIG. 4 illustrates another exemplary communication system for paging a wireless device comprising wireless device 402, access nodes 404, 406, and 408, access node selection node 410, inspection node 414, and communication network 412. Examples of wireless device 402 can include a cell phone, a smart phone, a computing platform such as a laptop, palmtop, or tablet, a personal digital assistant, an internet access device, or other device capable of voice communication using a plurality of dialers and communication protocols, including combinations thereof. Wireless device 402 and is in communication with access nodes 404, 406 and 408 over communication links 414, 416 and 418, respectively.

Each of access nodes 404, 406 and 408 is a network node capable of providing wireless communications to wireless device 402 and can be, for example, a base transceiver station, a radio base station, an eNodeB device or an enhanced eNodeB device. Access nodes 404, 406 and 408 are in communication with access node selection node 410 over communication links 420, 422 and 424, respectively.

Access node selection node 410 is a processing node configured to select tracking areas and/or access nodes for paging a wireless device. Access node selection node 410 can comprise a processor and associated circuitry to execute or direct the execution of computer-readable instructions for managing content. Access node selection node 410 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node selection node 410 can be for example, a standalone computing device or network element, or the functionality of access node selection node 410 can be included in another network element, such as a mobility management entity (MME), a gateway, a proxy node, or another network element. Access node selection node 410 in communication with communication network 412 over communication link 426, and with inspection node 414 over communication link 428.

Inspection node 414 is a network element which can comprise a processor and associated circuitry to execute or direct the execution of computer-readable instructions. Inspection node 414 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 414 can, among other things, perform deep packet inspection of packets sent from and/or to wireless device 402. Deep packet inspection generally involves an inspection of packets beyond Open Systems Interconnection (OSI) layer 2 including an inspection of the data portion of a packet (and possibly also the header of a packet). Inspection node 414 can be for example, a standalone computing device or network element, or the functionality of mode inspection node 414 can be included in another network element, such as access node selection node 410, a mobility management entity (MME), a gateway, a proxy node, or another network element.

Communication network 412 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise a wireless network, including base stations, wireless communication nodes, telephony switches, internet routers, network gateways, computer systems, communication links, or some other type of communication equipment, and combinations thereof. Communication network can use wired and/or wireless protocols analogous to those described above regarding communication network 106.

Communication links 414, 416, 418, 420, 422, 424, 426 and 428 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 404, 406, and 408, access node selection node 410, inspection node 414, and communication network 412 which are omitted for clarity, including additional processing nodes, routers, gateways, and physical and/or wireless data links for carrying data among the various network elements.

Figure 5:
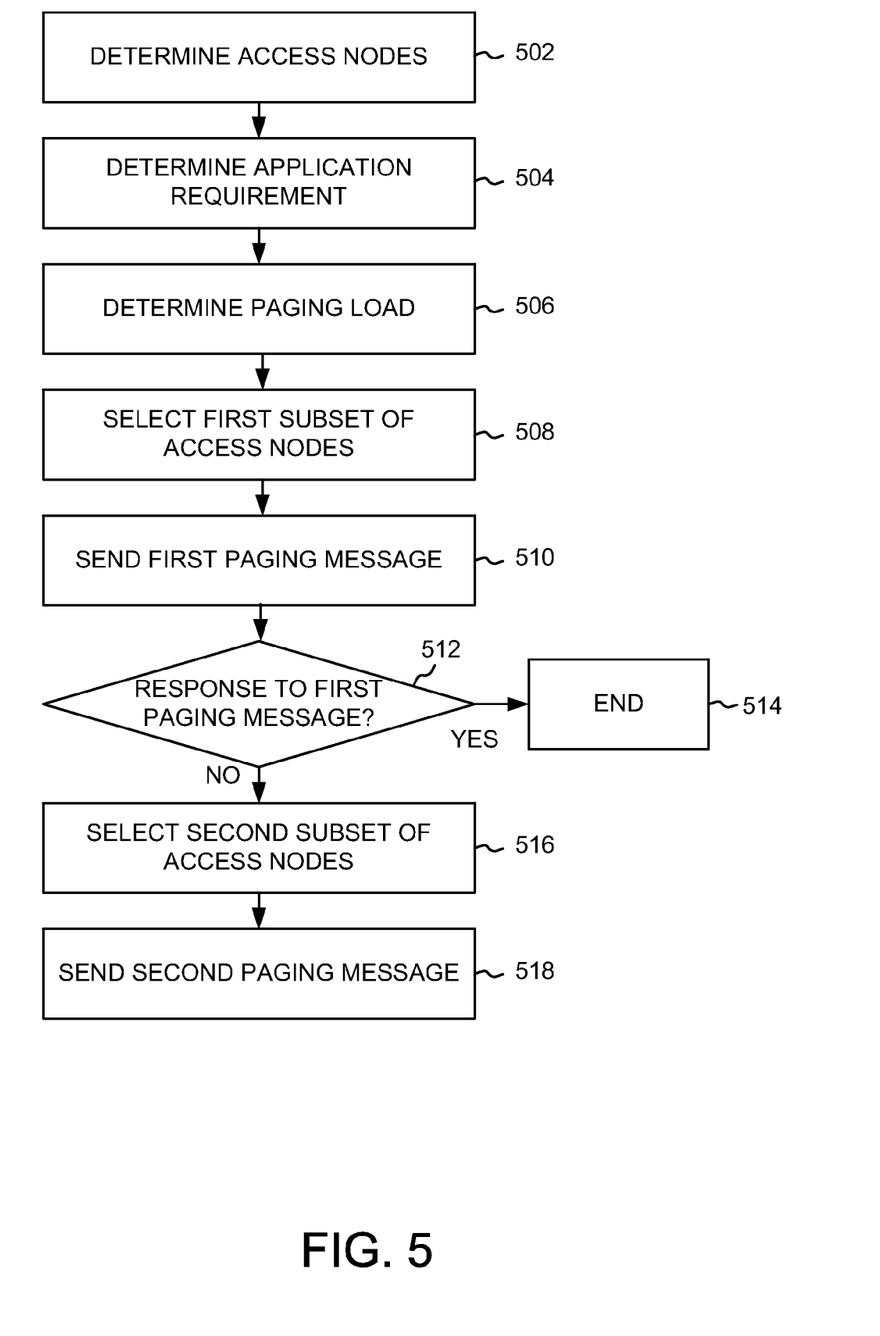
FIG. 5 illustrates another exemplary method of paging a wireless device.

FIG. 5 illustrates another exemplary method of paging a wireless device. In operation 502, access nodes are determined which can be used to send a paging message to a wireless device. For example, access nodes 404, 406 and 408 can be determined as access nodes which can be used to send a paging message to wireless device 402. Access nodes 404, 406 and 408 can be identified, for example, as members of a tracking area, or as members of a tracking area in a tracking area list, by use of identifiers which identify each access node to the communication network. In an embodiment, determining the access nodes can be performed at access node selection node 410.

In operation 504, an application requirement of an application running on wireless device 402 is determined. For example, an application running on wireless device 402 can be determined to be, for example, a delay sensitive application. Examples of a delay sensitive application include a streaming video application or a voice application (such as a VoIP application) which requires a minimum bit rate of data per unit time, or which can tolerate a maximum data delay per unit time, to meet a minimum performance requirement. A delay sensitive application can thus have an application requirement which meets a performance threshold. In an embodiment, an application requirement can be determined through the use of deep packet inspection (DPI) of packets sent to or received from wireless device 402, which can be performed by inspection node 414.

Figure 6:
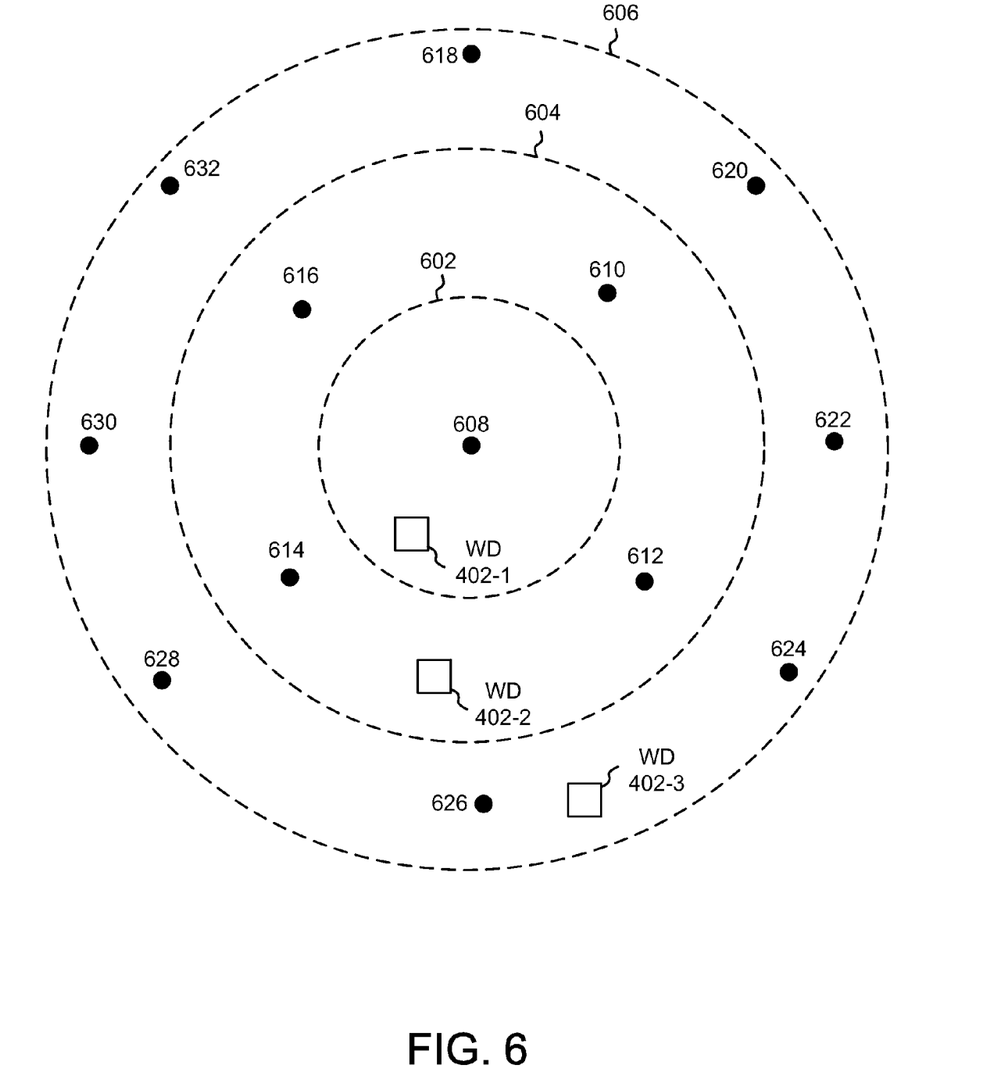
FIG. 6 illustrates an exemplary configuration of access nodes.

In operation 506, a paging load is determined. For example, the network paging load or network paging overhead to be incurred by sending a paging message to wireless device 402 can be determined. Based on the determined paging load, a first subset of access nodes can be selected to send a paging message to the wireless device (operation 508). The selection of the first subset of access nodes can be performed in light of the determined paging load and a paging load threshold, so that the number of access nodes selected as the first subset of access nodes does not cause the paging load to meet the paging load threshold. In an embodiment, the selection of the first subset of access nodes is based on the determined application requirement and the paging load threshold, so that a sufficient number of access nodes are selected to meet the application requirement and so that the paging load does not meet the paging load threshold. For example, referring to FIG. 6, within a first area 602, it may be sufficient to select access node 608 to send a paging message to wireless device 402 when it is in a first location (402-1). However, it may be insufficient to select only access node 608, for example, if wireless device 402 is in a second location (402-2). As an example, wireless device 402 may have previously been within area 602, and may have moved beyond area 602 but within area 604. Further, wireless device 402 may be in an idle mode, and its current location may know be known to the communication system. Area 602 represents an area which may effectively be reached by a paging message sent from access node 608, and area 604 represents an area which may effectively be reached by a paging message sent from access nodes 608, 610, 612, 614 and 616. Access nodes 610, 612, 614 and 616, as well as access node 608, may therefore be selected to send a paging message to wireless device 402. The selection of access nodes 608-616 can be based on a paging load and a paging load threshold and/or a determined application requirement of an application of wireless device 402. It should be noted areas 602, 604 and 606 are not intended to represent tracking areas, but areas which may effectively be reached by a paging message sent by access nodes. The access nodes illustrated in FIG. 6 can be a subset of access nodes within a tracking area, and can also be a subset of tracking nodes in the tracking areas of a tracking area list. While the areas in FIG. 6 are illustrated as circles for simplicity, this is merely exemplary, and the geometry of an area which may effectively be reached by a paging message can vary depending on numerous factors, including network topology and geography.

Returning to FIG. 5, in operation 510 a first paging message is sent to the wireless device. For example, a first paging message can be sent to wireless device 402 via access nodes 608, 610, 612, 614 and 616. When wireless device 402 responds to the paging message within a predetermined period of time (operation 512—YES) then no further paging messages are sent (operation 514). When wireless device 402 does not respond to the paging message within a predetermined period of time (operation 512—NO), then a second subset of access nodes are selected (operation 516). In an embodiment, the second subset of access nodes comprises a larger number of access nodes than the first subset of access nodes. The first and the second subset of access nodes can comprise subsets of access nodes within a tracking area and/or subsets of tracking nodes in the tracking areas of a tracking area list. In an embodiment, the second subset of access nodes is selected based on the paging load and the application requirement. In operation 518, a second paging message is sent to the second subset of access nodes.

Figure 7:
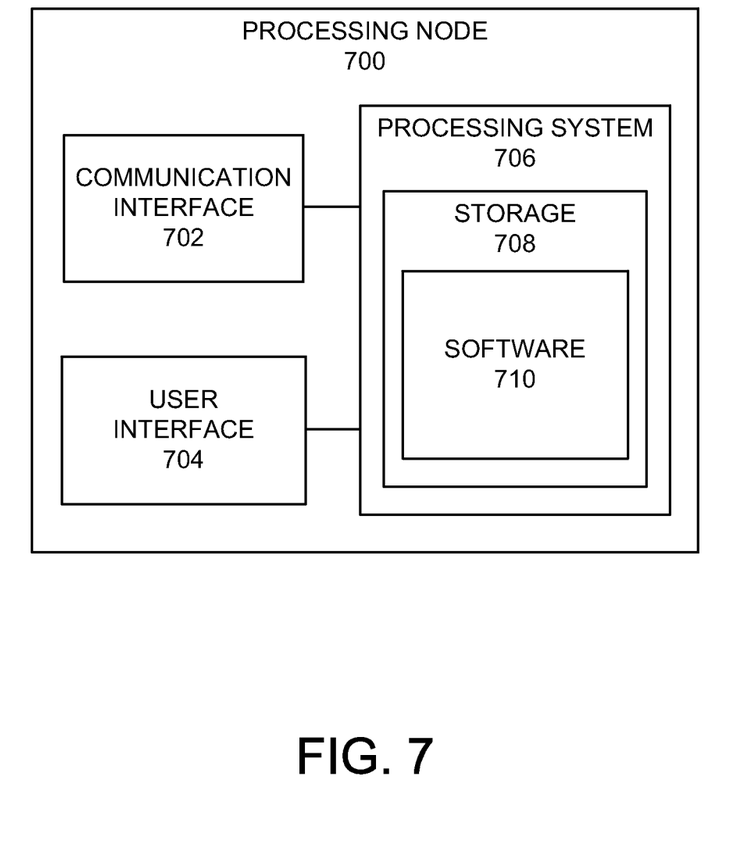
FIG. 7 illustrates an exemplary processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node selection node 410. Processing node 700 can also be an adjunct or component of a network element, such as an element of access node 104, 404, 406 and/or 408, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of paging a wireless device, comprising:
identifying a plurality of access nodes associated with a tracking area as members of a tracking area list;
performing deep packet inspection of a plurality of data packets at an inspection node and, based on the inspection, identifying an application type and associated traffic requirement of an application running on a wireless device;
predicting a paging load associated with paging the plurality of access nodes of the tracking area list and, based on the predicted paging load and the identified traffic requirement, selecting a first subset of access nodes from the plurality of access nodes that does not meet a paging load threshold;
sending a first paging message for the wireless device to the first subset of access nodes; and
after a predetermined period of time expires, selecting a second subset from the plurality of access nodes, the second subset of selected access nodes being larger than the first subset of selected access nodes.

2. The method of claim 1, wherein the traffic requirement of the application comprises at least one of a minimum data requirement and a maximum delay requirement of the application.

3. The method of claim 1, further comprising:
selecting the second subset of access nodes of the tracking area list based on the identified traffic requirement and the predicted paging load when a response to the first paging message is not received from the wireless device within a predetermined period of time; and
sending a second paging message to the second subset of selected access nodes.

4. A system for paging a wireless device, comprising:
a processing node, configured to:
identify a plurality of access nodes associated with a tracking area as members of a tracking area list;
perform, via an inspection node, deep packet inspection of a plurality of data packets and, based on the inspection, identify an application type and associated traffic requirement of an application running on a wireless device;

predict a paging load associated with paging the plurality of access nodes of the tracking area list and, based on the predicted paging load and identified traffic requirement, select a first subset of access nodes from the plurality of access nodes that does not meet a paging load threshold;

send a first paging message for the wireless device to the first subset of selected access nodes; and after a period of time expires, select a second subset from the plurality of access nodes, the second subset of selected access nodes being larger than the first subset of selected access nodes.

5. The system of claim 4, wherein the traffic requirement of the application comprises at least one of a minimum data requirement and a maximum delay requirement of the application.

6. The system of claim 4, wherein the processing node is further configured to:

select the second subset of access nodes of the tracking area list based on the identified traffic requirement and the predicted paging loads when a response to the first paging message is not received from the wireless device within the period of time; and send a second paging message to the second subset of selected access nodes.

7. A method of paging a wireless device, the method comprising:

identifying a plurality of tracking areas as members of a tacking area list, each of the plurality of tracking areas including one or more access nodes;

receiving a plurality of data packets for an idle wireless device at an inspection node, wherein deep packet inspection of the data packets is performed at the inspection node to identify an application type and associated traffic requirement of an application running on the idle wireless device;

predicting a paging load generated by paging groups of access nodes located in the plurality of tracking areas;

selecting a first subset of access nodes from among the plurality of tracking areas based on the predicted paging load not meeting a paging load threshold; and sending a first paging message to the wireless device via the first subset of access nodes.

* * * * *